Figure 1:
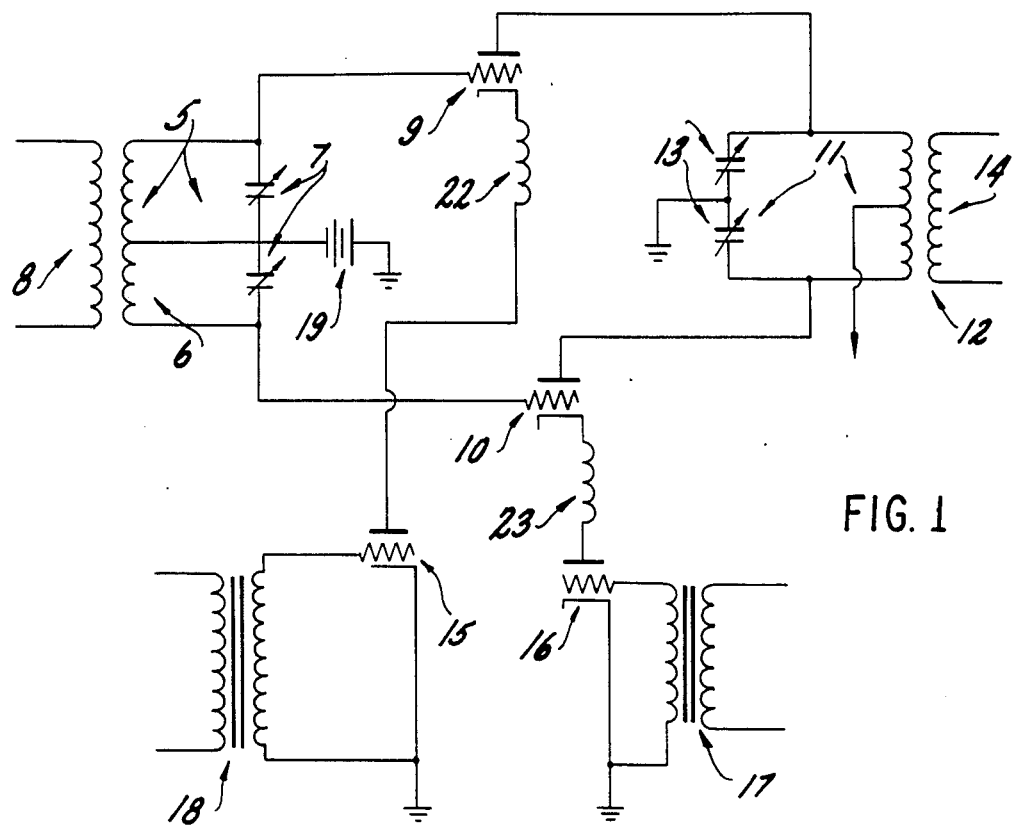

United States Patent [19]

Bryan

[11] Patent Number: 4,680,751
[45] Date of Patent: Jul. 14, 1987

[54] POLARIZED CARRIER MODULATION

[76] Inventor: James W. Bryan, 4910 Mud La., Louisville, Ky. 40229

[21] Appl. No.: 90,648

[22] Filed: Nov. 2, 1979

Related U.S. Application Data

[63] Continuation of Ser. No. 810,271, Jun. 27, 1977, abandoned.

[51] Int. Cl.⁴ .............................................. A04J 3/02
[52] U.S. Cl. ........................................ 370/78; 332/63
[58] Field of Search ................ 370/78; 332/43 R, 40, 332/63, 60, 64

[56] References Cited

U.S. PATENT DOCUMENTS

| | | | |
|---|---|---|---|
| Re. 25,699 | 12/1964 | Kidd | 370/77 |
| 1,914,570 | 6/1933 | Jenkins | 370/45 |
| 2,728,892 | 12/1955 | Gluyas | 332/63 |
| 2,921,981 | 1/1960 | Kidd | 370/78 |
| 3,166,722 | 1/1965 | Reid | 332/63 |

Primary Examiner—Douglas W. Olms

[57] ABSTRACT

This invention provides means for controlling the carrier current in an R.F. amplifier whereby the positive and negative excursions of the carrier current are in accordance with separate modulation signals and a receiver for reproducing the separate modulation signals.

1 Claim, 2 Drawing Figures

POLARIZED CARRIER MODULATION

This application is a continuation of Ser. No. 810,271, filed June 27, 1977 and now abandoned.

This invention relates to communication systems in general and more particularly to systems employing means for the simultaneous transmission of two modulating signals on a single carrier and this application is a substitue application for Ser. No. 54,867 filed July 14, 1970, now abandoned, wherein it was illustrated that the positive and negative excursions of the carrier current were controlled by seperate modulation signals.

It is the primary object of this invention to provide means whereby the positive and negative excursions of the carrier current are in accordance with seperate modulation signals to reduce the required band width for the simultaneous transmission of two modulation signals.

It is a further object to reduce the required band width by transmitting the modulation signals within the carrier current.

A further object is to provide means for controlling the supply current to an R.F. amplifier for effecting control of the carrier current at modulation signal amplitudes.

A further object is to provide a receiver employing means responsive to the modulation signals contained within the carrier current.

The construction of the invention features a pair of electronic tubes connected in a conventional push-pull arrangement biased so as to provide seperate channels for the positive and negative excursions of the carrier current.

A reactance element and a modulation signal amplifier are connected in series with the output of the push-pull connected tubes.

The value of the reactance element is such that signal current will flow through the reactance element at the carrier frequency.

A modulation signal applied to the modulation amplifier controls the impedance of the reactance modulator circuit to produce a phase shift in the carrier current accordingly.

The receiver utilized for reception of the transmitted carrier features a pair of diodes connected in opposite phase and having a load resistance connected in series with the carrier current conducted through the diodes.

An output signal in accordance with the modulation signals contained within the carrier current will be produced across the load resistors.

Figure 2:
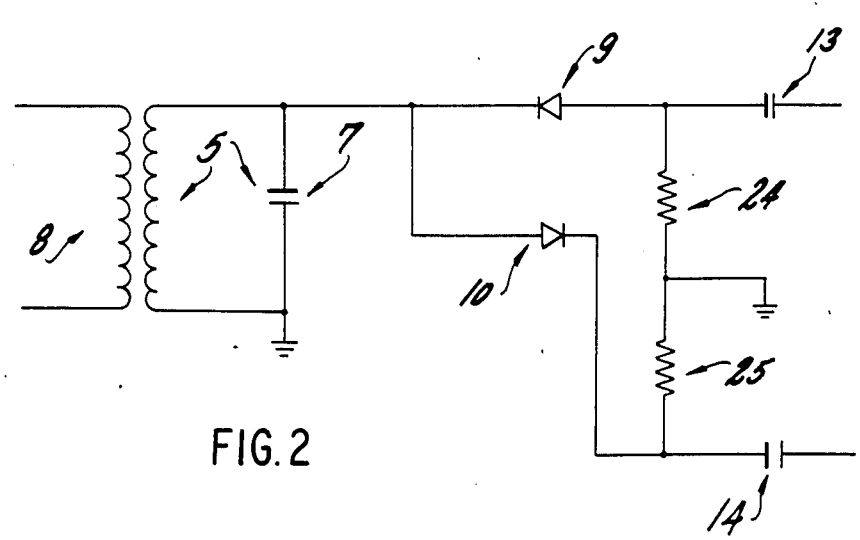

These, together with the various objects and features of the invention, which will become apparent is attained by this system designed as a polarized carrier current modulation system, preferred embodiments of which have been illustrated in the accompanying drawings, by way of example only wherein:

FIG. 1 is a schematic wiring diagram of an amplifier incorpoating the concepts of the present invention, FIG. 2 is a diagram of a receiver for reproducing the modulation signals from the carrier current components.

With continuing reference to the accompanying drawings, and initially to FIG. 1, there is shown a push-pull carrier amplifier generally indicated by reference numeral 21.

Battery 19 provides a bias between the control elements of tubes 9 and 10 and a reference or ground point whereby tubes 9 and 10 are responsive only to different exclusive portions of the carrier signal from its alternating current axis, and it will be noted that there is provided a pair of modulator tubes 15 and 16 each of which is connected in series with a reactance element and one of the carrier tubes 9 and 10 and a source of current whereby the operating phase angle of the carrier current supplied to the tubes 9 and 10 is in accordance with the output of tubes 15 and 16.

In the illustrated drawing, the output of control tube 15 provides the carrier current for tube 9 and the output of control tube 16 provides the carrier current for tube 10.

The carrier signal is applied to amplifier tubes 9 and 10 by means of transformer coil 6, the center tap of which is connected to battery 19.

The tubes 15 and 16 connected as illustrated are in series with the operating current supplied to tubes 9 and 10 at the center tap connection elements 22 and 23 of coil 12.

The inductor elements 22 and 23 connected in series with tubes 15 and 16 form a phase modulator the impedance of which is controlled by the applied modulation signals to produce a shift in the phase angle of the carrier current conducted through the inductor elements.

Since the current in tubes 15 and 16 for all practical purposes is in phase with the applied signal while in the inductor elements it is 90 degrees out of phase with the applied signal, the phase relationship between current and voltage in the circuit as a whole may be anything between zero and 90 degrees depending on the relative amounts of resistance and reactance.

Assuming that a carrier signal is applied to tubes 9 and 10 and modulation signals applied to tubes 15 and 6, the current conducted through the inductors 22 and 23 will shift in phase in accordance with the modulation signals. The amplitude of the carrier current in tube 9 will be in accordance with the modulation signal applied to tube 15 while the amplitude of the carrier current in tube 10 is in accordance with the modulation signal applied to tube 16.

Since tubes 9 and 10 are biased to be responsive only to the positive excursions of the carrier signal, the carrier current output from the push-pull arrangment will comprise a positive component in accordance with one modulation signal and a negative component in accordance with a second modulation signal.

The receiver utilized for reception of the transmitted carrier is designed to respond to the modulation signal amplitudes contained within the carrier current and comprises a pair of diodes 9 and 10 connected in a manner that will permit diode 10 to conduct in accordance with the positive excursions of the carrier current and diode 9 to conduct in accordance with the negative excursions.

The carrier current is conducted through the load resistors 24 and 25 to produce the modulation signals.

The modulation signal amplitudes contained in the positive excursions will be developed across load resistor 11 and may be coupled by means of capacitor 14 to a first output signal terminal, and the modulation signal amplitudes contained in the negative excursions will be developed across load resistor 12 and may be coupled by means of capacitor 13 to a second output signal terminal.

A switching arrangment may be employed in the transmitter and receiver to provide means for selecting the desired mode of operation in an arrangement whereby only one modulation signal is desired.

The various component parts used in the construction of this polarized modulation system are of standard values and it is to be recognized that the main concept of the invention is in a system wherein sperate modulation signals are contained within the positive and negative excursions of the carrier current and the use of a control tube to control the operating current supplied to the carrier amplifier.

The foregoing is considered as illustrative only of the principles of the invention, further, since numerous modufications and changes will readily occur to those skilled in the art, it is not desired to limit the invention to the exact construction and operation shown and described and accordingly all suitable modifications and equivalents may be resorted to, falling within the scope of the invention as claimed.

I claim:

1. A polarity multiplexer comprising: a push-pull amplifier comprising two amplifying means each amplifying a different exclusive portion of a carrier signal applied to its input, two modulation amplifiers receiving respective different input signals and each providing a respective modulation output signal, an inductor coupling each modulation output signal in series with a respective amplifying means to thereby modulate the output of each amplifying means in accordance with the modulation output signal, whereby different input signals are modulated on respective portions of the carrier having different polarities.

* * * * *